(No Model.)  6 Sheets—Sheet 1.

S. P. DENISON.
AUTOGRAPHIC TELEGRAPH.

No. 315,392.  Patented Apr. 7, 1885.

Witnesses:
A. M. Long
Alex. Scott

Inventor:
S. P. Denison
By Robt. D. Radcliff
Atty.

(No Model.)
S. P. DENISON.
AUTOGRAPHIC TELEGRAPH.
No. 315,392. Patented Apr. 7, 1885.
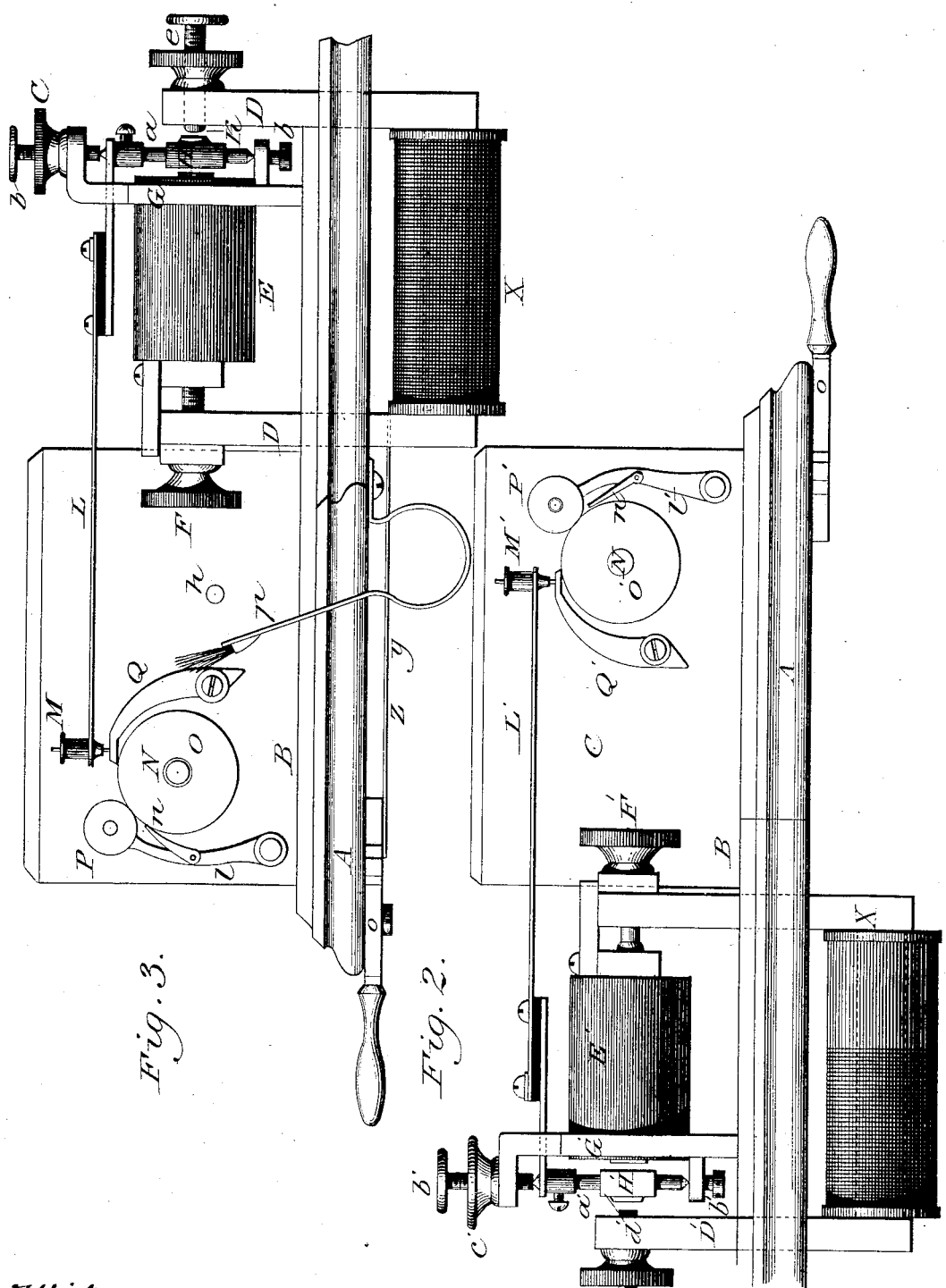
Witnesses:
Alex Scott
A. M. Long.
Inventor.
S. P. Denison,
By Robt. D. Radcliffe
Atty (No Model.)

S. P. DENISON.

AUTOGRAPHIC TELEGRAPH.

No. 315,392. Patented Apr. 7, 1885.

Witnesses:
A. M. Long
Alex. Scott

Inventor:
S. P. Denison
by Robt. D. Radcliffe
Atty.

(No Model.) 6 Sheets—Sheet 4.
S. P. DENISON.
AUTOGRAPHIC TELEGRAPH.

No. 315,392. Patented Apr. 7, 1885.

Witnesses: Alx. Scott, N. M. Long.

Inventor: S. P. Denison, By Robt D Radcliffe, Atty.

(No Model.)  6 Sheets—Sheet 5.

S. P. DENISON.
AUTOGRAPHIC TELEGRAPH.

No. 315,392. Patented Apr. 7, 1885.

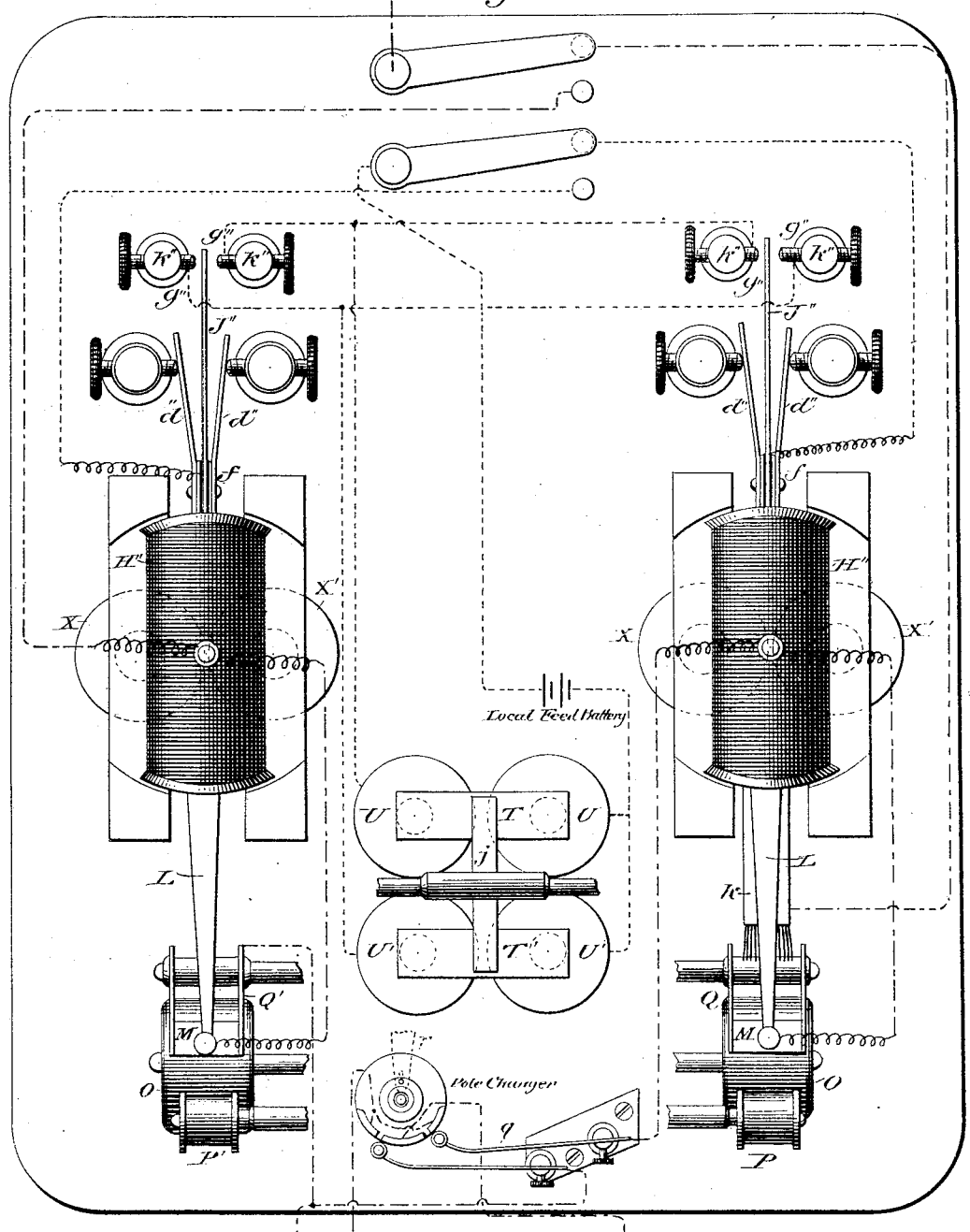

UNITED STATES PATENT OFFICE.

SYLVESTER P. DENISON, OF NEW YORK, N. Y., ASSIGNOR OF ONE-HALF TO ROBERT D. RADCLIFFE, OF SAME PLACE.

AUTOGRAPHIC TELEGRAPH.

SPECIFICATION forming part of Letters Patent No. 315,392, dated April 7, 1885.

Application filed February 9, 1885. (No model.)

*To all whom it may concern:*

Be it known that I, SYLVESTER P. DENISON, a citizen of the United States, residing in the city of New York, in the State of New York, have invented certain new and useful Improvements in Autograph or Copying Telegraph-Instruments, of which the following is a specification.

My invention relates to certain improvements in the construction, form, and arrangement of the parts of an original invention an application for a patent for which was made by me and filed with the Commissioner of Patents on the 17th of June, 1884, and for which a patent is about to be granted.

The objects of my improvements are to make more certain and exact the operation of the instruments described in the former case, and to render their use more simple and practicable. I attain these objects by the arrangement and forms illustrated in the accompanying drawings, which form a part hereof, and in which I have shown the entire instrument as improved, the new parts or features of which will be pointed out as they are severally reached in this description.

Figure 1:
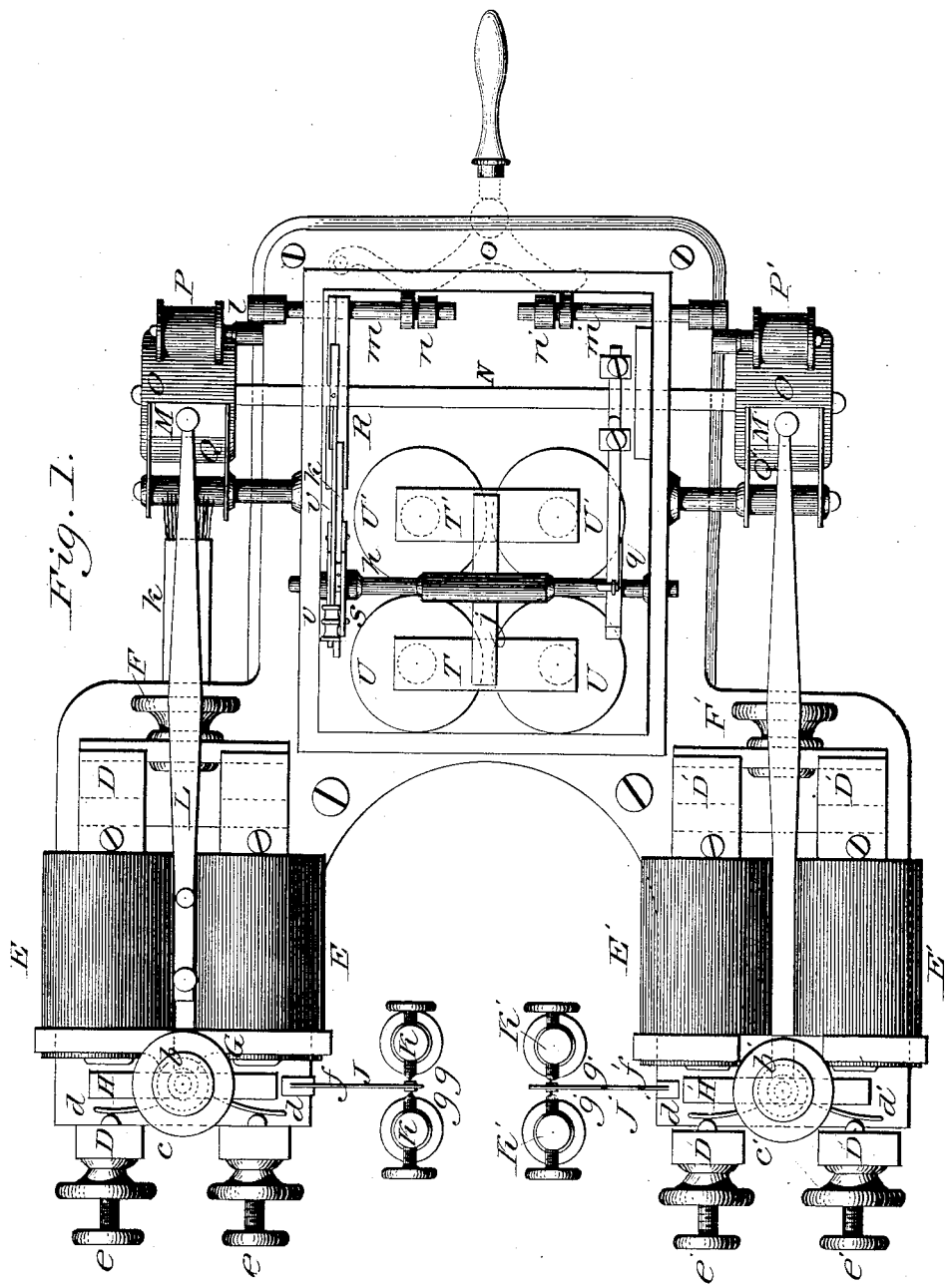
Figure 4:
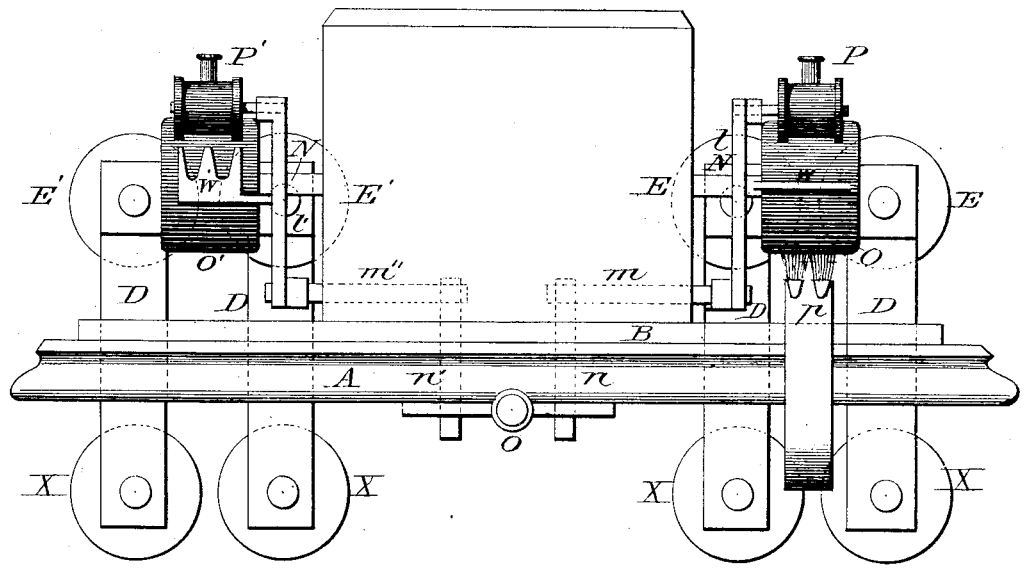
Figure 5:
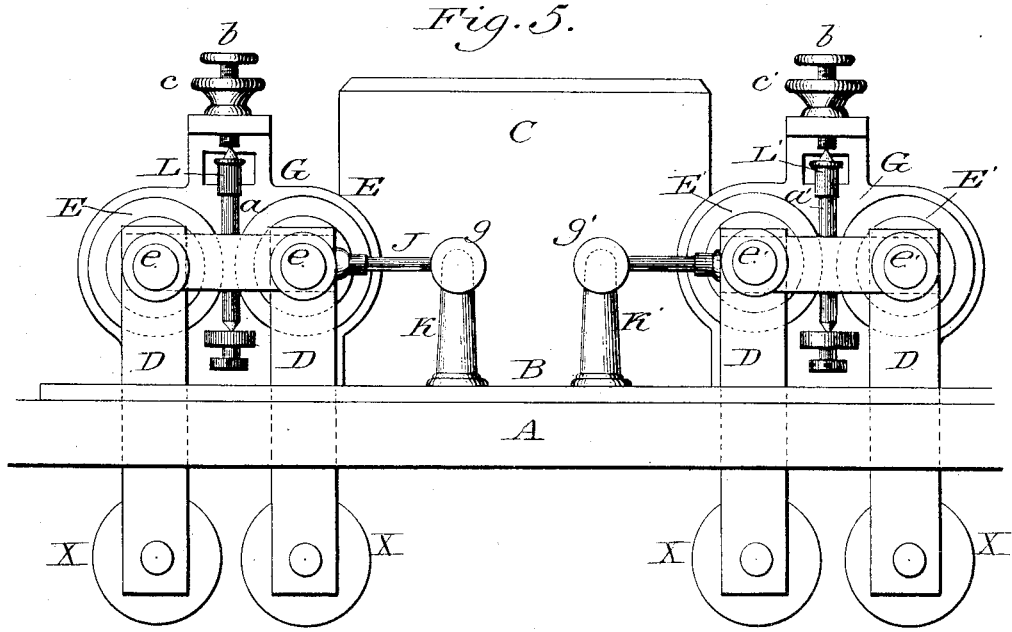
Figure 6:
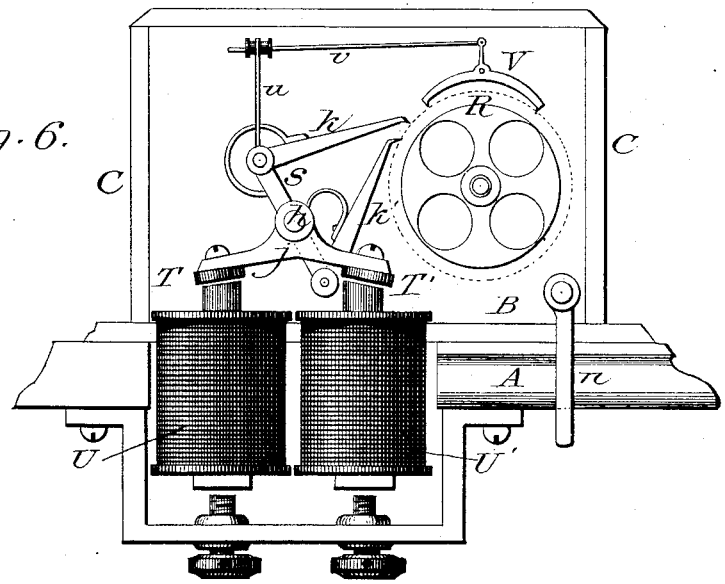
Figure 7:
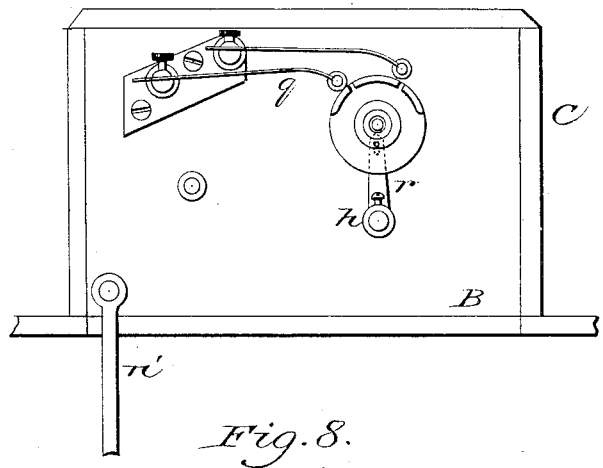
Figure 8:
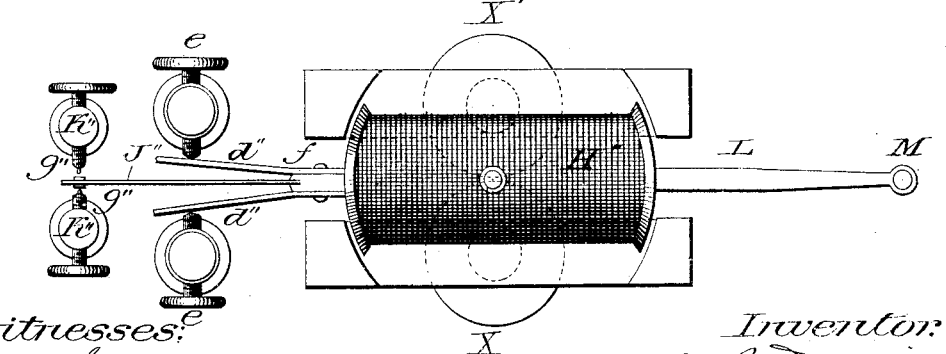
Figure 9:
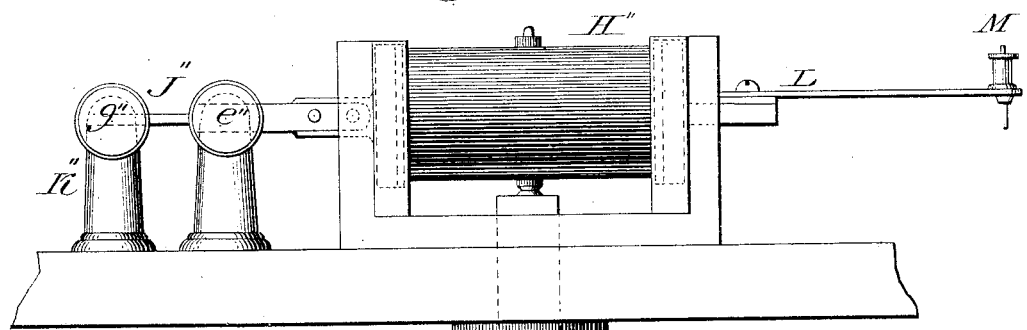
Figure 10:
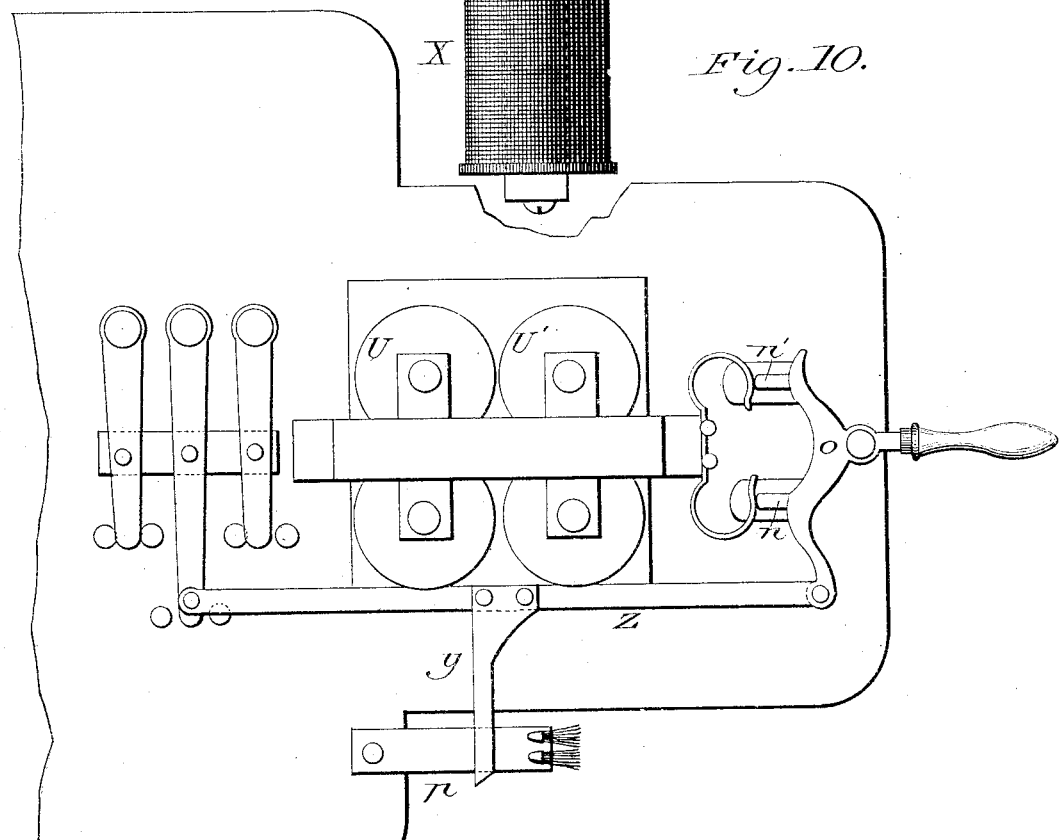

Figure 1 is a plan view showing the different parts of the machine to be seen from the top. Fig. 2 is a view of one side, showing the parts to be seen on the receiving side of the instrument. Fig. 3 is a view of the other side, showing the parts to be seen on the transmitting side. Fig. 4 is a view showing the parts to be seen from the front. Fig. 5 is a view showing the parts to be seen from the back. Fig. 6 is a view of one side of the interior of the box, showing the magnets and the several parts of the feed mechanism. Fig. 7 is a view of the other side of the interior of the box, showing the several parts of the pole-changer. Figs. 8 and 9 are plan and side views of another form of that portion of the machine which operates the arms carrying the electrodes. Fig. 10 is a view of the under side of the base of the machine, showing the operation of the switches, the contact-brush, and the friction-rollers moved by a single lever. Fig. 11 is a diagrammatic view showing the course of the several circuits used in the instrument and their various connections.

Similar letters refer to similar parts throughout the several views.

In the form herein shown and described, as in the former case, the machines are arranged for the use of continuous strips or fillets of paper or its substitute for the transmission or reception of the characters or messages; but in the present case, instead of the arrangement by which the operating magnets and electrode or stylus were shifted from one side to the other, as the instruments were to be used for transmitting or receiving, the machines are provided with two sets of operating parts permanently fixed on either side of the feed mechanism, one to be used for transmitting and the other for receiving, and the connections are so made that when one side is in use the other is switched out of the circuit; hence in the following description the similar parts of the two sides will be designated by the same letters, but distinguished from each other by the sign ′ on the receiving side.

A is the frame or shelf, of wood or other suitable material, to the top and under side of which all the parts of the machine are attached. The outline of its shape, which, for convenience, follows the general contour of the machine itself, is shown in Fig. 1.

B is a bed-plate, of metal, the shape of which is also shown in Fig. 1. It is securely fastened to the bed A.

C is a metal box which contains the feed mechanism and pole-changer. It is closed on top with a glass cover and firmly secured to the plate B.

D D D′ D′ are permanent magnets, each pair connected so as to form practically but one. They are similarly located as to their poles, and can be kept charged or re-enforced by being wound with wire, through which a current passes, as shown at X. They are also secured to the plate B.

Attached to the magnets D D D′ D′ by the screws F F′ are the electro-magnets E E′, which can be advanced or withdrawn by the screws F F′, and the front ends of which are held in place by the frames G G'. Projections on the frame G G' form a pivot-frame for the pivots $a\,a'$, the seats of which, for the purpose of adjustment, are in the ends of the screws $b\,b'$, which have binding-nuts $c\,c'$.

Secured to the pivots $a\,a'$ are the armatures H H'. Fastened to the armatures H H' are the rebounding springs $d\,d'$, which, by the vibrations of the armatures, are brought alternately in contact with the screws $e\,e\,e'\,e'$, which are set in the ends of the permanent magnets D D D' D'. The screws $e\,e\,e'\,e'$ are adjustable so as to make the contact with the springs $d\,d$ light or firm, as may be required. Another object of the springs $d\,d'$ is to assist in the vibrations of the armatures H H' by helping them at the instant of starting from either side and prevent sticking at the poles.

Fixed to one extremity of the armatures H H', and insulated from it by the connecting-pieces $f\,f'$, which are of hard rubber or other suitable material, are the contact-springs J J', which are provided with small platinum plates near the ends, and, vibrating with the armatures H H', act on the relay-points $g\,g\,g'\,g'$, which are set in the posts K K K' K' and connected on the under side by wires to the two feed-magnets U U', in such a manner as at each vibration to bring said magnets alternately into the circuit of a local battery.

Secured to the pivots $a\,a'$, but insulated from them at an intermediate point, as shown in Figs. 2 and 3, are the arms L L', having at their extremities the electrodes or styluses M M', suitably arranged with incased springs to maintain a delicate contact with the paper as they vibrate over its surface.

The feed mechanism is mostly contained in the box C, and consists of the magnets U U', their connected armatures T T', which as the magnets are alternately energized impart a tilting or rocking motion to the shaft $h$, to which they are fixed by the connecting-piece $j$, the rocking lever S, also fixed to the shaft $h$, the pawls $k\,k'$, the ratchet-wheel R, and the escapement V, with its connecting-levers $u\,v$. As the rocking motion is imparted to the lever S the pawls $k\,k$ engage alternately in the teeth of the wheel R, and cause it and the shaft N, to which it is fixed, to revolve step by step. The escapement V is so adjusted by the levers $u\,v$, by which it is connected to an intermediate point on the lever S, that only one tooth of the ratchet is allowed to pass at each movement, thus preventing irregularity of the feed.

The shaft N extends through the sides of the box C, and on each end is secured one of the feed-rollers O O', which can be made of any substance, but preferably of hard rubber. They are made about the width of the strip of paper to be used in the machine, and are adjusted so their center line will be opposite the electrodes M M' when the latter are at rest.

P P' are friction-rollers, turning freely on spindles set in the arms $l\,l'$, attached to the shafts $m\,m'$, which, near their inner extremities, have the arms $n\,n'$, extending down through slots in the base A, and so set that the cam-lever $o$, as it is moved to the right or left, will alternately bring one of the rollers P P' in sufficiently close contact with one of the feed-rollers O O' to firmly grip the strip of paper, while the other is removed a sufficient distance to leave the paper free. Thus, while both the feed-rollers O O' are always in motion when either side of the machine is being operated, the paper of one side is made to feed and that of the other to remain still, as desired, by moving the lever $o$ to the proper side.

$w\,w'$ are pins or scrapers to separate the paper from the feed-rollers, which are also set in the arms $l\,l'$.

Q Q' are guides for the strips of paper as they pass under the electrodes M M' and are delivered to the feed-rollers. They are of metal fixed on studs set in the sides of the box C. The sides are raised to prevent any lateral movement of the strips, and at the upper ends the bottom forms a plate to present a proper surface or bearing for the paper at the point where the electrode vibrates upon it.

On the transmitting side a wire brush, $p$, is fixed, as shown in Figs. 1 and 3, which maintains a metallic connection continually on the transmitting-strip. It is so arranged as to be thrown back when that side of the instrument is not in use.

Placed also in the box C, on one of its inner sides, as shown at $q$ in Figs. 1 and 7, is one form of a pole-changer, although any other convenient form may be used. It has three plates on the periphery of a wheel and two contact-rollers, as shown, with proper binding-posts for connecting the wires, the different parts being properly insulated by the use of suitable material. A rocking motion sufficient to carry alternate plates under the two contact-rollers is imparted to the wheel by an arm, $r$, attached to the rocking shaft $h$, which, by a slot near its upper end, engages with a pin set in the side of the wheel in such a manner that as the shaft rocks in one direction it turns the wheel sufficiently to bring the center plate under the contact-roller that had previously rested on one of the others, which reverses the polarity of the line in which the magnets E or E' are placed, and cause the armature H or H' to vibrate one stroke, and by the contact-spring J or J' and one of the relay-points $g$ or $g'$ to actuate the opposite pair of the feed-magnets U U', which, by attracting its armature, rocks the shaft $h$ in the reverse direction, and the arm $r$ turns the wheel so as to bring the plates back to their former position to again and again repeat the operation just described as fast as the energy of the current and the arrangement of the mechanism will allow.

On the under side of the bed A, as shown in Fig. 10, is arranged a double or triple switch, according as it may be desired to operate the machine with one line or two, which are all moved at once by the arm Z, attached to the cam-lever o. These switches throw the currents of the several circuits used into either the transmitting or receiving side of the instrument, and the arm Z is so arranged that as the lever o is moved to bring one of the friction-rollers in contact with its feed-roller the switch is set to pass the current through that side of the machine and cut out the other.

On the lever Z is fixed the arm y, which engages with the brush p, so that when the transmitting side is cut out it throws back the brush, and as the switch is reversed it again brings it into the position desired for transmitting.

In Figs. 8 and 9 is shown another form of magnets and armatures for producing the vibrations of the arms L and the electrodes M, with the relay-spring J. In this case the armature H″ is wound with wire in the form of a helix, and the current through which the changes of polarity are sent pass through it instead of through the magnets E E′, as in the other case, and the armature is pivoted so as to swing freely. The electro-magnets X′ take the place of the permanent magnets already described, and are provided with field-plates, as shown, properly formed and placed to exert their influence at the ends of the armatures. The rebounding springs are shown at d″ d″ and the contact-spring and relay-points at J‴, k″ k″ and g″ g″ performing the same functions as the spring J and the points g g.

Each machine is provided with insulated wires leading to the switches from the binding-posts, where the line and battery wires enter, so arranged that the currents will only be closed through the line and local circuits when the transmitting side in one machine and the receiving side in the other are thrown in by their respective switches, or, in other words, that when the switches at the two machines are so set as to throw in both receiving sides or both transmitting sides the line and local circuits will be open. This is a familiar arrangement, involving only the ordinary function of switches; so it is not shown in detail. The machines are then connected by the line-wire. In some cases it may be found desirable to use a separate wire for the transmission of the message impulses, to provide for which I have shown the third arm of the triple switch in Fig. 10.

In the form here shown, where a pole-changer is used in each machine, a full set of batteries is needed at each station; but an intermediate station for the battery of the main line may be used, and a means for introducing changes of polarity into the current be then located if found more convenient or desirable.

In case a separate wire is used for the transmission and recording of the message impulses, the current from the battery enters the machine and is carried through the switch to the insulated arm L; thence it passes through the electrode or stylus to the transmitting-strip, thence to the brush p, and from thence to the second line-wire. At the receiving-machine it enters and is directed by the switch to the arm L; thence it passes through the electrode and receiving-paper to the metal plate of the guide Q′, and from thence to ground.

Both poles of the battery of the main or operating line are brought into the transmitting-machine and carried to the plates on the wheel of the pole-changer q, where one leg is connected to the middle plate and the other to both the side plates. If it is found desirable to wind the permanent magnets D D D′ D′ with wire, for the purpose of keeping them charged or re-enforced, as described, as shown in Figs. 2, 3, 4, and 5, or if the form shown in Figs. 8 and 9 is used, the current from this battery may be passed through the helices of the permanent magnets before it is carried to the plates of the pole-changer. From the contact-rollers one wire is carried to the ground, and the other through the magnet E or the wound armature H⁴ and the switch to the line. At the receiving-machine it enters, and, diverted by the switch from the pole-changer, passes directly to the magnet E′, and from thence to ground. In the case of only one line-wire being used, the course of the current through the arms L and the electrodes or styluses was fully shown in the former case.

Each machine has a local battery to actuate the feed-magnets U U′, as has been already explained.

Having thus described the different parts of my machine in its improved form, with the alternate device for producing the vibrations of the electrodes or the styluses, as shown in Figs. 8 and 9, and the arrangement of the switches and circuits, its operation is as follows, and for the purpose of making this explanation more easily understood the case of only two machines placed in circuit will be taken: Two machines being constructed exactly similar to each other and with all the parts as above described, care being taken to have the similar poles of the permanent or field magnets similarly located in each, are set up at distant points and connected as described. On the receiving side the strip on which messages are to be received is prepared by properly moistening it with any solution easily decomposed by electrolysis, and placed on a reel or in any other convenient form in such position that, after the end having been passed through its guide and around its feed-roller, it will be fed continuously under its electrode when the friction-roller is pressed down and that side of the machine is actuated. As in my previous case, the characters or message to be transmitted are written on the transmitting-strip previous to its being placed in the machine. On a non-conductive strip the ink must be conductive; but if the surface be metallic or conductive, insulating-ink is used. After being so written, it is placed in position in the guide on the transmitting side of the machine from which it is to be sent, and the margin left for that purpose is passed under the electrode or stylus and around the feed-roller, so that the friction-roller will grip it when brought down. The handle of the cam-lever o at the transmitting-station is then moved over, so as to bring the friction-roller down on the transmitting-strip and close the circuits through that side of the machine, and at the distant machine this operation is reversed, so that the circuits will be closed through the receiving side and the receiving-strip be gripped by the friction-roller. This closes all the circuits through the two machines and on the line, the pole-changer begins to work, actuating the magnets E of one machine and E' of the other at the same instant, so as to cause the armatures to vibrate together; or, if the form shown in Figs. 8 and 9 is used, the armatures H'' in both machines are simultaneously energized with the same polarity and simultaneously follow the reversals of the pole-changer and vibrate together. The armatures, by the arms L L', vibrate the electrodes or styluses over the surface of their respective strips, and by the springs J and J' alternately energize the feed-magnets U U', which keeps the pole-changer in operation and drives the feed mechanism so that the paper in each machine is fed forward one step at each vibration. When the transmitting-slip has all passed through, or so much of it as is desired, the handle of the cam-lever is moved to the other side, which sets the switches so as to connect the other side of the machine and grips the receiving-strip, which places the instrument in readiness to receive a message from the other end of the line. At each instrument the operation is the same. When the arm of the cam-lever is over to the receiving side, both instruments are ready to receive, the lines are open, and if a message to be transmitted is placed in position and the arm moved over to the transmitting side both instruments start at once.

As already stated, the operation of the machines at both ends of the line is the same. By the movement of the cam-lever either is converted into a transmitter or receiver, as desired, and messages can be sent in either direction. In case more than two machines are placed in the same circuit, the line or lines, instead of being carried to ground at the first receiving-station, as above described, are carried from machine to machine, and go to ground after passing through the last.

What I claim as my invention in this case, and desire to secure by Letters Patent, is—

1. An automatic autographic telegraph-instrument having the operating stylus or electrode vibrating over the surface of the substance on which the message is written or is to be recorded attached to or connected with an armature pivoted in the field of a permanent magnet, the said armature being polarized by a helix placed in the main line and actuated by certain changes of polarity introduced into the current on said line, substantially as set forth.

2. The stylus or electrode M, the arm L, rigidly attached to the armature H'' in the circuit of the main line, and pivoted at its center, in combination with a means for reversing the polarity of the current, substantially as described.

3. The stylus or electrode M, the arm L, rigidly attached to the armature H'', which is pivoted at its center, both the armature and the stylus being in the circuit of the main line, in combination with a means for reversing the polarity of the current, whereby the changes of polarity cause the vibrations of the armature, and the circuit is preserved for the transmission of the message-impulses, substantially as set forth.

4. The combination of the following parts: means for reversing the polarity of the current of the main line, the armature H'', with its field-magnets, the contact-springs J'', and the relay-points $g''$ $g''$, and battery connections and magnets by which the feed mechanism is actuated and brought into exact unison with the vibrations of the operating stylus or electrode, and means for causing changes of polarity on the line, substantially as described.

5. The combination of the electro-magnets U U' with the relay-points $g''$ $g''$, and the contact-springs J'', attached to and operated by the armatures H'', by which the said magnets are alternately energized, and by the connected armatures T T' a rocking motion given to the shaft $h$, substantially as described.

6. The combination of the mechanism for feeding either of the two strips of paper under the electrodes, consisting of the electro-magnets U U', the tilting connected armatures T T', the shaft $h$, the rocking lever S, the pawls $k$ $k'$, the connecting-levers $u$ $v$, the escapement V, the ratchet-wheel R, the drums O O', the friction-rollers P P', and the cam-lever $o$, by which one of the said rollers is made to engage with its drum while the other is withdrawn, substantially as herein described.

7. The pole-changer $q$, consisting of three plates on the periphery of a rocking wheel and two contact-rollers operated by a means other than that of the current passing through it, substantially as herein shown and described.

8. The combination of the pole-changer $q$ with the feed mechanism operated by a local battery for reversing the current on the main line, whereby the said current is not taxed to reverse its own polarity, and at the same time the motions of the various parts and the action of the main and local circuits are made reciprocal and the operation of the entire machine automatic, substantially as herein set forth and described.

9. The combination, in one machine, of two electrodes or styluses with their operating armatures and magnets with a single feed mechanism having two feed-drums and friction-rollers, the several parts connected by a circuit-controlling mechanism whereby either stylus may be operated at will, and the same machine be thus used for transmitting or receiving, substantially as herein set forth and described.

SYLVESTER P. DENISON.

Witnesses:
 AUG. F. GILLENDER.
 PHILIP WOOD.